United States Patent
Nagatsuka

(10) Patent No.: US 9,844,884 B2
(45) Date of Patent: Dec. 19, 2017

(54) MECHANICAL HAND WITH MOVABLE GRIPPING MEMBERS

(71) Applicant: THK CO., LTD., Tokyo (JP)

(72) Inventor: Masaki Nagatsuka, Tokyo (JP)

(73) Assignee: THK CO., LTD., Tokyo (JP)

(*) Notice: Subject to any disclaimer, the term of this patent is extended or adjusted under 35 U.S.C. 154(b) by 105 days.

(21) Appl. No.: 14/785,263

(22) PCT Filed: Feb. 26, 2014

(86) PCT No.: PCT/JP2014/054640
§ 371 (c)(1),
(2) Date: Oct. 16, 2015

(87) PCT Pub. No.: WO2014/171187
PCT Pub. Date: Oct. 23, 2014

(65) Prior Publication Data
US 2016/0082600 A1 Mar. 24, 2016

(30) Foreign Application Priority Data
Apr. 19, 2013 (JP) ................. 2013-088077

(51) Int. Cl.
*B66C 1/42* (2006.01)
*B25J 15/00* (2006.01)
*B25J 15/02* (2006.01)

(52) U.S. Cl.
CPC ....... *B25J 15/0028* (2013.01); *B25J 15/0273* (2013.01); *Y10S 901/36* (2013.01); *Y10S 901/38* (2013.01)

(58) Field of Classification Search
CPC .............. B25J 15/0273; B25J 15/0253; B25J 15/0266; B25J 15/0028; Y10S 901/38; Y10S 901/36

(Continued)

(56) References Cited

U.S. PATENT DOCUMENTS 4,696,503 A * 9/1987 Collodel .............. B25J 15/0273
294/119.1
4,735,452 A * 4/1988 Nemoto ............... B25J 15/0273
294/119.1

(Continued)

FOREIGN PATENT DOCUMENTS

JP 54-47273 A 4/1979
JP 57-61488 A 4/1982

(Continued)

OTHER PUBLICATIONS

International Search Report dated May 13, 2014, issued in corresponding application No. PCT/JP2014/054640.

(Continued)

*Primary Examiner* — Gabriela Puig
(74) *Attorney, Agent, or Firm* — Westerman, Hattori, Daniels & Adrian, LLP

(57) ABSTRACT

A mechanical hand is provided that can increase the operation stroke and also the gripping force of a pair of gripping members. The hand includes first and second sliders, a driving source, a rotating plate, a first clamping link. Of these components, the first and second sliders are provided on a hand body so as to be linearly movable in opening and closing directions and the driving source is provided in the hand body. The rotating plate is rotatably driven by the driving source. The first clamping link is linked with the rotating plate so as to be only rotatable on a first shaft, and is linked with the first slider so as to be only rotatable on a second shaft. Moreover, the second clamping link is linked with the rotating plate so as to be only rotatable on a third shaft, and is linked with the second slider so as be only rotatable on a fourth shaft. The first and second sliders move linearly in the opening and closing directions by making the driving source rotate the rotating plate.

12 Claims, 9 Drawing Sheets

(58) Field of Classification Search
USPC .......................................... 294/119.1; 901/38
See application file for complete search history.

(56) References Cited

U.S. PATENT DOCUMENTS

| | | | | |
|---|---|---|---|---|
| 5,224,747 | A * | 7/1993 | Tsuchiya | B23Q 7/043 |
| | | | | 279/110 |
| 6,626,476 | B1 * | 9/2003 | Govzman | B25J 15/0273 |
| | | | | 294/119.1 |
| 2002/0171254 | A1 * | 11/2002 | Mccormick | B25J 15/028 |
| | | | | 294/119.1 |

FOREIGN PATENT DOCUMENTS

| JP | 60-39089 A | 2/1985 |
|---|---|---|
| JP | 2001-105371 A | 4/2001 |

OTHER PUBLICATIONS

The Notification of Reasons for Refusal issued on the corresponding Japanese Patent Application No. 2013-088077 dated Jul. 28, 2015; with English translation. (9 pages).

\* cited by examiner

MECHANICAL HAND WITH MOVABLE GRIPPING MEMBERS

TECHNICAL FIELD

The present invention relates to a hand which is provided with, at least, two gripping members and grasps an object by opening and closing the gripping members.

BACKGROUND ART

As this type of conventional hand, there is known a hand which has a main body in which guide grooves are formed, a pair of sliders, and a pair of gripping members (for example, refer to Patent Literature 1). In this hand, the pair of sliders are arranged linearly movable in the guide grooves in the opening/closing directions and the pair of gripping members are attached to the pair of sliders. The pair of gripping members can be driven by a drive source arranged in the main body such that the gripping members are moved in the opening/closing directions. When the pair of gripping members are moved in the closing direction (that is, when the pair of gripping members are moved closer to each other), the gripping members can grip a substance, while, in contrast, when the pair of gripping members are moved in the opening direction (that is, when the pair of gripping members are moved to separate from each other), the gripping members can release the substance A mechanism for moving the pair of gripping members in the opening/closing directions is structured as follows. A disk cam is attached to an output shaft of the drive source. As shown in FIG. 9, a pair of cam grooves 71a are formed in a point symmetry on the disk cam 71. A pair of pins 72 attached to the pair of sliders are fit in the pair of grooves 71a. In response to rotation of a rotating plate serving as a driver, the pair of pins 72 which serve as followers are caused to slide in the pair of cam grooves 71a, which makes the pair of gripping members move linearly in the opening/closing directions. The cam grooves 71a can be formed linearly in the radial direction as shown in FIG. 9 or can be formed in a spiral shape.

CITATION LIST

Patent Literature

Patent Literature 1: Japanese Patent Application Laid-open No. 2001-105371

SUMMARY OF THE INVENTION

Technical Problem

However, in the conventional hand, when the rotation angle of the disk cam reaches a predetermined angle (for example, approximately 45 degrees), the pins fall out from the cam grooves. It is thus required to limit the rotation angle of the disk cam to an angle which prohibits the pins from falling off the cam grooves. Therefore, there is a problem that the operation stroke of the pair of gripping members, which grip objects, is reduced.

Moreover, an object gripping force of the pair of gripping members is approximately constant and not so large, independently of the rotation angles of the disk cam. This means that the conventional hand has a difficulty in gripping heavier objects. This is because a relationship between the rotation angles of the disk cam and amounts of movement of the sliders is almost linear, and the gripping force of the gripping members, which is generated by rotation torque of the drive source, is almost unchanged depending on the rotation angles of the disk cam.

Additionally, since the pins are structured to slide in the cam grooves of the disk cam, a clearance is needed between each pin and each cam groove of the disk cam. This results in a difficulty that, due to the presence of the clearance, an object may be dropped from the hand when external vibration is applied to the hand.

Hence it is an object of the present invention to provide a hand in which the pair of gripping members can provide a larger gripping force as well as a larger operation stroke.

Solution to Problem

In order to accomplish the foregoing object, a hand is provided with: a hand body; a first slider and a second slider which are arranged on the hand body such that the first and second sliders are linearly movable in opening and closing directions; a first gripping member and a second gripping member which are attached to the first and second sliders respectively and which are capable of gripping an object; a drive source arranged in the hand body; a rotating plate driven to rotate by the drive source; a first clamping link connected to the rotating plate so as to enable only rotation on a first shaft and connected to the first slider so as to enable only rotation on a second shaft; and a second clamping link connected to the rotating plate so as to enable only rotation on a third shaft and connected to the second slider so as to enable only rotation on a fourth shaft, wherein the drive source rotates the rotating plate so that the first and second gripping members linearly move in the opening and closing directions.

Advantageous Effects of the Invention

In the present invention, (1): since the strokes of the first and second gripping members can be larger, the gripping members can grip a variety of sizes of objects which include smaller-size objects to larger-size objects. In addition, (2): when the rotation angle of the rotating plate approaches 90 degrees or thereabouts (i.e., the first and second axis lines of the first clamping link and the third and fourth axis lines of the second clamping link are lined up on a straight line), the gripping force increases sharply. Hence, if the pair of gripping members are designed such that these gripping members grip an object when the rotation angle of its rotating plate becomes approximately 90 degrees, the gripping members can grip heavier objects or lock a gripped object. Thanks to the above advantages (1) and (2), the hand can have higher general versatility.

DESCRIPTION OF EMBODIMENTS

Figure 1:
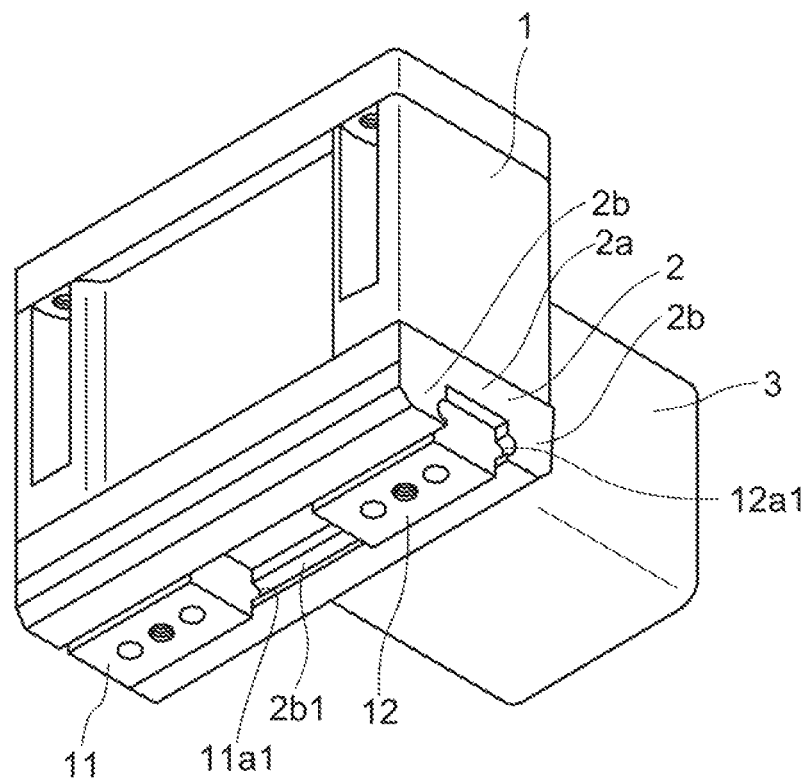
FIG. 1 is a perspective view showing an appearance of a hand according to an embodiment of the present invention.
Figure 2:
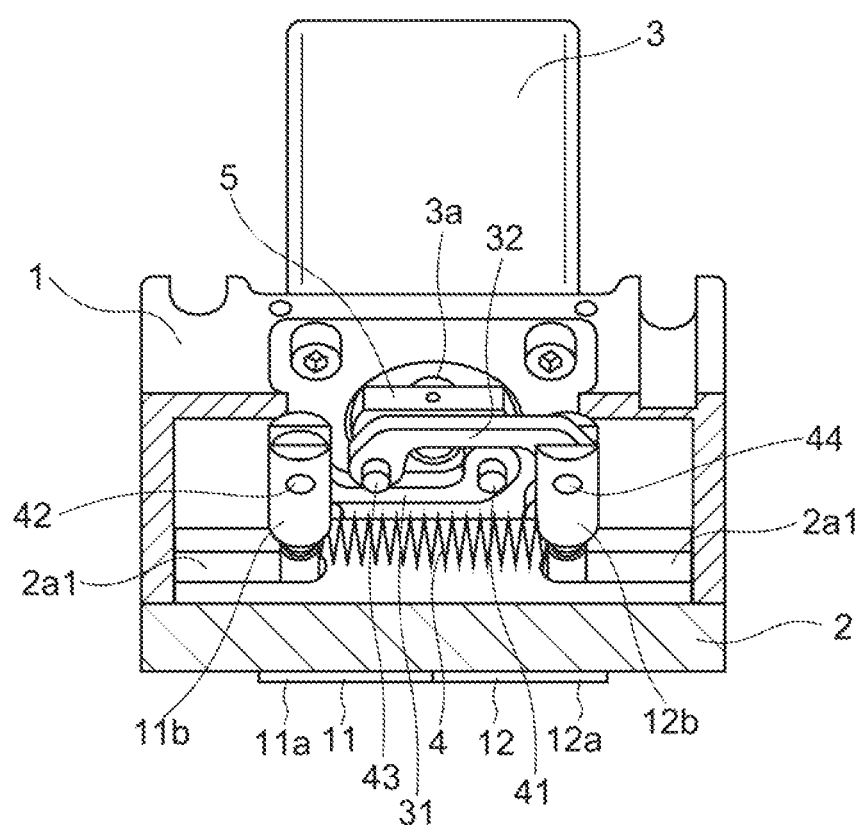
FIG. 2 is a perspective view showing an internal structure of the hand according to the embodiment.

With reference to the accompanying drawings, a hand according to an embodiment of the present invention will now be described in detail. FIG. 1 shows a perspective view of appearance of the hand according to the embodiment, while FIG. 2 shows an internal structure of the hand according to the present embodiment. The hand according to the present embodiment is used as an end effector of a robot, for example. The hand according to the present embodiment is provided with a hand body 1 whose appearance is approximately cubic, first and second sliders 11 and 12, and an electric motor 3. The first and second sliders 11 and 12 are provided at a rail 2 arranged in the hand body 1 such that the sliders 11 and 12 are linearly movable in opening/closing directions. The electric motor 3 is provided as a drive source to open and close the first and second sliders 11 and 12. Although first and second gripping members 21 and 22 (refer to FIGS. 4 and 5) are attached to the first and second sliders 11 and 12 respectively, such first and second gripping members 21 and 22 are omitted from being drawn in FIGS. 1 and 2 for the sake of an easier understanding of the first and second sliders 11 and 12.

The hand body 1 has one end portion on which a rail 2 is provided along a movement direction of the first and second sliders 11 and 12. The rail 2 is elongated in the movement direction of the first and second sliders 11 and 12, and to have a U-shaped section. The first and second sliders 11 and 12 are assembled with the rail 2 such that the sliders 11 and 12 are linearly movable therealong. The first slider 11 is provided so as to move within a left-side half zone on the rail 2, whilst the second slider 12 is provided so as to move within a right-side half zone on the rail 2. Both the first and second sliders 11 and 12 are allowed to move simultaneously in a closing direction (specifically, a direction in which the sliders move closer to each other) or in an opening direction (specifically, a direction in which the sliders separate from each other). The first and second sliders 11 and 12 are allowed to move symmetrically to the center of the rail 2. FIG. 1 shows a state where the first and second sliders 11 and 12 have moved to respective ends in the opening direction, while FIG. 2 shows a state where the first and second sliders 11 and 12 have moved to respective ends in the closing direction.

The rail 2 includes a bottom portion 2a and a pair of mutually opposed side-wall portions 2b. The first and second sliders 11 and 12 are arranged to be pinched between the paired side-wall portions 2b of the rail 2. Rolling members, such as bolls, are arranged, so as to be rotatable for rolling motions, between the rail 2 and the first and second sliders 11 and 12. On each of the inner surfaces of the side-wall portions 2b of the rail 2, a rolling-member rolling path 2b1 is formed to extend in the length-wise direction of the rail 2.

FIG. 2 shows an internal structure of the hand body 1. In FIG. 2, the first and second sliders 11 and 12 can be seen under the rail 2, in which the first and second sliders 11 and 12 remain at respective ends in the closing direction. The first and second sliders 11 and 12 are provided with, respectively, blocks 11a and 12a guided by the rail 2 so that the blocks 11a and 12a can be moved linearly and link shafts 11b and 12b, serving as link members, which project from the blocks 11a and 12a into the hand body 1 (refer to FIG. 5). On the bottom portion 2a of the rail 2, slits 2a1 are formed so as to allow the link shafts 11b and 12b to pass through.

The blocks 11a and 12a of the first and second sliders 11 and 12 are pinched between the paired side-wall portions 2b of the rail 2. In the blocks 11a and 12a, there are formed rolling-member rolling paths 11a1 and 12a1 which are formed to face the rolling-member rolling paths 2b1 of the rail 2 (refer to FIG. 1). A plurality of rolling members are provided between the rolling-member rolling paths 2b1 of the rail 2 and the rolling-member rolling paths 11a1 and 12a1 of the blocks 11a and 12a so that the rolling members can be rolled and moved. Such plural rolling members are sustained by cages which prevents contacts between or among the rolling members. In the present embodiment, the blocks 11a and 12a are designed to have limited strokes and a circulation structure along which the rolling members circulate is not provided in the blocks 11a and 12a, however, the blocks can be provided with such a circulation structure for the rolling members.

The link shafts 11b and 12b are fixed to the blocks 11a and 12a respectively. The blocks 11a and 12a have holes 13 and 14 formed to allow the link shafts 11b and 12b to be inserted therein (refer to FIG. 5). The link shafts 11b and 12b have two-branched end portions. At the end portion of the link shaft 11b, a second shaft 42 is arranged so as to rotatably support the first clamping link 31. In the same way, at the end portion of the link shaft 12b, a fourth shaft 44 is arranged so as to rotatably support the second clamping link 32. A coil spring 4 is bridged between the pair of link shafts 11b and 12b to serve as a forcing member for forcing the first and second sliders 11 and 12 in the closing direction.

The electric motor 3 is attached to a side wall of the hand body 1. The electric motor 3 has an output shaft 3a projecting inside the hand body 1. On the output shaft 3a of the electric motor 3, a rotating plate 5 is fixed so as to rotate together with the output shaft 3a. The rotating plate 5 is driven by the electric motor 3 to rotate on the axis line. An encoder is provided in the electric motor 3, thus making it possible to detect an origin to be returned to and a gripping position using the encoder. The rotating plate 5 is provided with a first shaft 41 which rotatably supports the first clamping link 31 and a third shaft 43 which rotatably supports the second clamping link 32. The first and third shafts 41 and 43 are positioned to be point-symmetric around the axis line of the rotating plate 5, that is, apart from each other by 180 degrees in the circumferential direction of the rotating plate 5.

Figure 3:
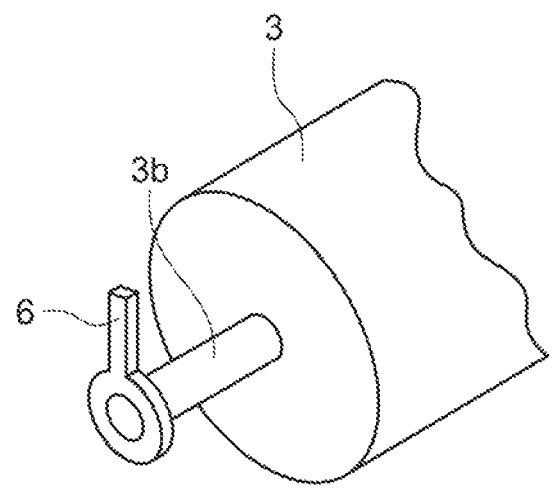
FIG. 3 is a schematic view showing an operation member for an electric motor installed in the hand according to the embodiment.

As shown in FIG. 3, the electric motor 3 has the output shaft 3b and this output shaft 3b extends in the depth direction of the drawing of FIG. 2. On the output shaft 3b of the electric motor 3, an operation member 6, which is composed of a knob or a lever, is attached so that the rotating plate 5 can be rotated manually.

Figure 4:
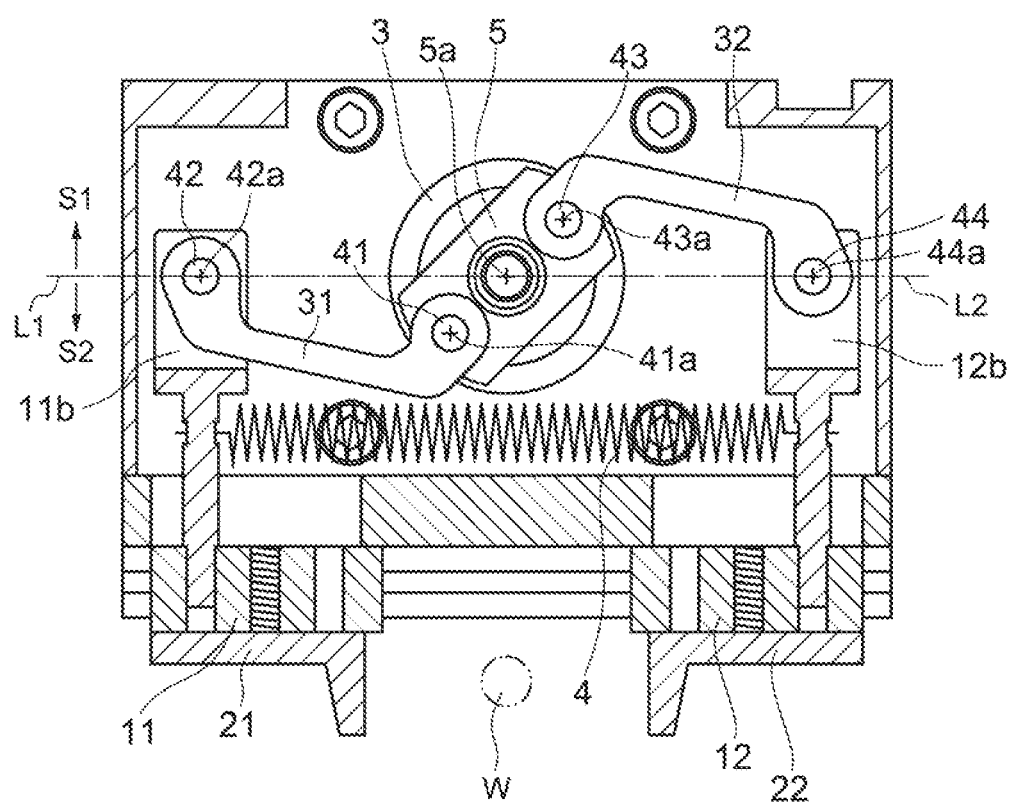
FIG. 4 is a sectional view showing a clamping mechanism of the hand according to the embodiment (, in which a pair of gripping members are shown in their open state)
Figure 5:
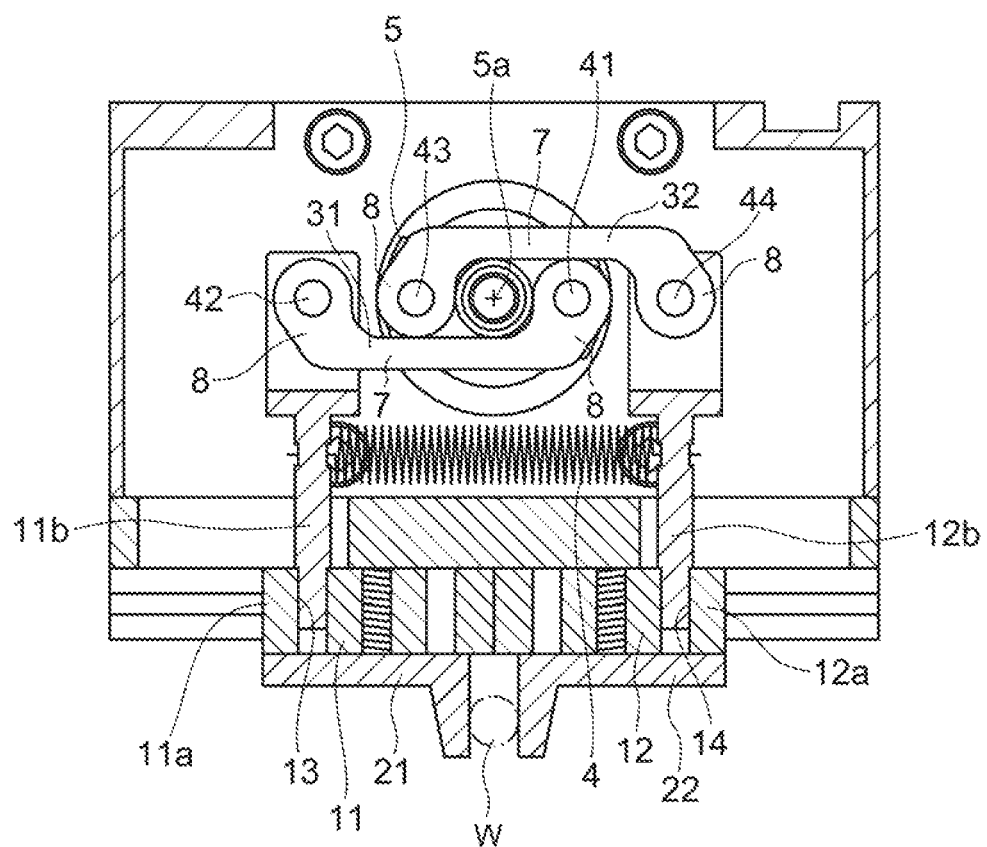
FIG. 5 is a sectional view showing the clamping mechanism of the hand according to the embodiment (, in which the pair of gripping members are shown in their closed state)

FIGS. 4 and 5 show sections of the hand presented when viewed in a direction which is along axis lines of the first to fourth shafts 41 to 44. Of these drawings, FIG. 4 shows a state where the pair of gripping members 21 and 22 are open, while FIG. 5 shows a state where the pair of gripping members 21 and 22 are closed. When the electric motor 3 rotates the rotating plate 5 clockwise, the pair of gripping members 21 and 22 become open as shown in FIG. 4. In contrast, when the electric motor 3 rotates the rotating plate 5 counterclockwise, the pair of gripping members 21 and 22 become closed as shown in FIG. 5. The coil spring 4 forces the gripping members 21 and 22 so that the gripping members 21 and 22 forcibly close with each other. In the present embodiment, when the pair of gripping members 21 and 22 is gripping an object W, there is provided a clamping mechanism which prevents the object W from being dropped even if the power to the electric motor 3 is lost during its operation. The clamping mechanism will now be detailed as follows.

As shown in FIG. 4, the fist clamping link 31 is connected to the rotating plate 5 so as to be only rotatable around the first shaft 41 and also connected to the link shaft 11b of the first slider 11 so as to be only rotatable around the second shaft 42. In other words, the first clamping link 31 and the rotating plate 5 compose a turning pair, while the first clamping link 31 and the first slider 11 compose another turning pair. Similarly to the above, the second clamping link 32 is connected to the rotating plate 5 so as to be only rotatable around the third shaft 43 and also connected to the link shaft 12b of the second slider 12 so as to be only rotatable around the fourth shaft 44. In other words, the second clamping link 32 and the rotating plate 5 compose a turning pair, while the second clamping link 32 and the second slider 12 compose another turning pair.

As shown in FIG. 5, in cases where the first and second gripping members 21 and 22 move to grip an object W, the first to fourth shafts 41 to 44 are lined up on a straight line when viewed along a direction of the axis lines of the first to fourth shafts 41 to 44. That is, of the first to fourth shafts 41 to 44, from the left to the right, the second shaft 42, the third shaft 43, the axis line 5a of the rotating plate 5, the first shaft 41, and the fourth shaft 44 are lined up in this order.

Figure 6:
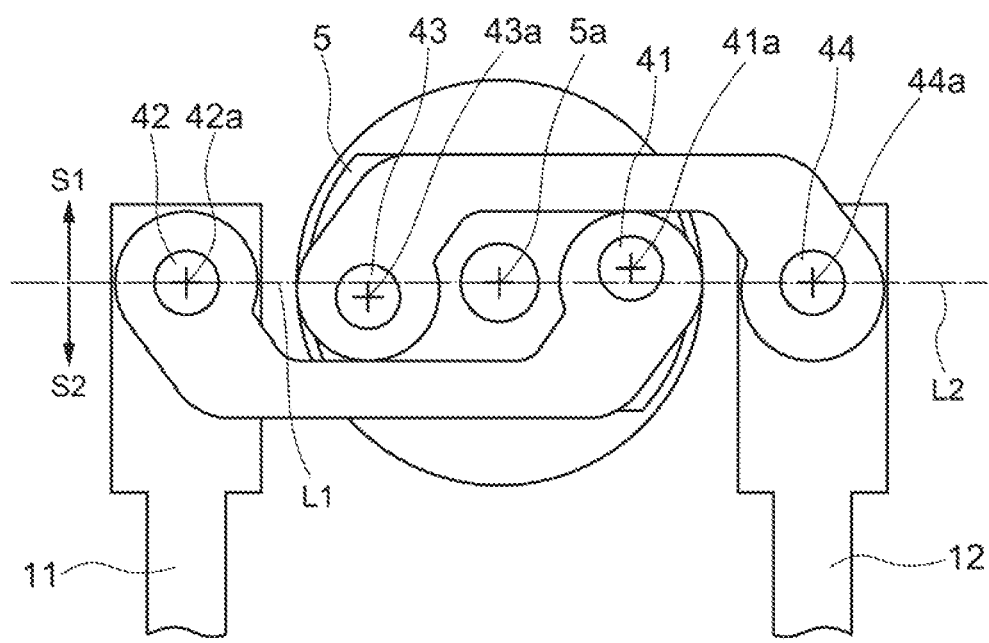
FIG. 6 is a sectional view showing the clamping mechanism of the hand according to the embodiment.

Specifically, when the first and second gripping members 21 and 22 move to grip the object W, the first to fourth shafts 41 to 44 are lined up once and the rotating plate 5 is then rotated until realizing a state where, as shown in FIG. 6, the center 43a of the third shaft 43 moves beyond a line L1 connecting the axis line 5a of the rotating plate 5 and the center 42a of the second shaft 42 and also the center 41a of the first shaft 41 moves beyond a line L2 connecting the axis line 5a of the rotating plate 5 and the center 44a of the fourth shaft 44.

As shown in FIG. 4, in a state where the pair of gripping members 21 and 22 is open, the center 43a of the third shaft 43 is located in one, region S1, of two regions S1 and S2 which are sectioned by the line L1 connecting the axis line 5a of the rotating plate 5 and the center 42a of the second shaft 42. On the other hand, as shown in FIG. 6, in a state where the pair of gripping members 21 and 22 is closed, the center 43a of the third shaft 43 moves beyond the line L1 to be located in the region S2.

Similarly to the above, as shown in FIG. 4, in a state where the pair of gripping members 21 and 22 is open, the center 41a of the first shaft 41 is located in one, region S2, of the two regions S1 and S2 which are sectioned by the line L2 connecting the axis line 5a of the rotating plate 5 and the center 44a of the fourth shaft 44 (the line L1 and the line L2 correspond to each other). On the other hand, as shown in FIG. 6, in a state where the pair of gripping members 21 and 22 is closed, the center 41a of the first shaft 41 moves beyond the line L2 to be located in the region S1. As described, the line L2 connects the axis line 5a of the rotating plate 5 and the center 44a of the fourth shaft 44.

As shown in FIG. 5, to avoid mutual interference between the first and second clamping links 31 and 32 in a state where the first to fourth shafts 41 to 44 are lined up on the straight line, each of the first and second clamping links 31 and 32 is formed in a U-shape. For this purpose, each of the first and second clamping links 31 and 32 includes a central portion 7 which is linear in shape and a pair of bent portions 8 which are provided at both ends of the central portion 7, the bent portions 8 being bent respectively. One of the bent portions 8 of the second clamping link 32 is located to be sandwiched between the paired bent portions 8 of the first clamping link 31, while one of the bent portions 8 of the first clamping link 31 is located to be sandwiched between the paired bent portions 8 of the second clamping link 32.

The first and second gripping members 21 and 22 are fixed to the first and second sliders 11 and 12 respectively by using fastening means such as bolts. A distance between the paired first and second gripping members 21 and 22 is set depending on outer sizes of objects W. This distance will not be limited to a particular amount, and can be set to various amounts as long as the first and second gripping members 21 and 22 can grip the objects. In the configuration shown in FIG. 5, the first and second sliders 11 and 12 make partial contact to each other, but this is just an example; the first and second sliders 11 and 12 may be separated from each other.

Figure 7:
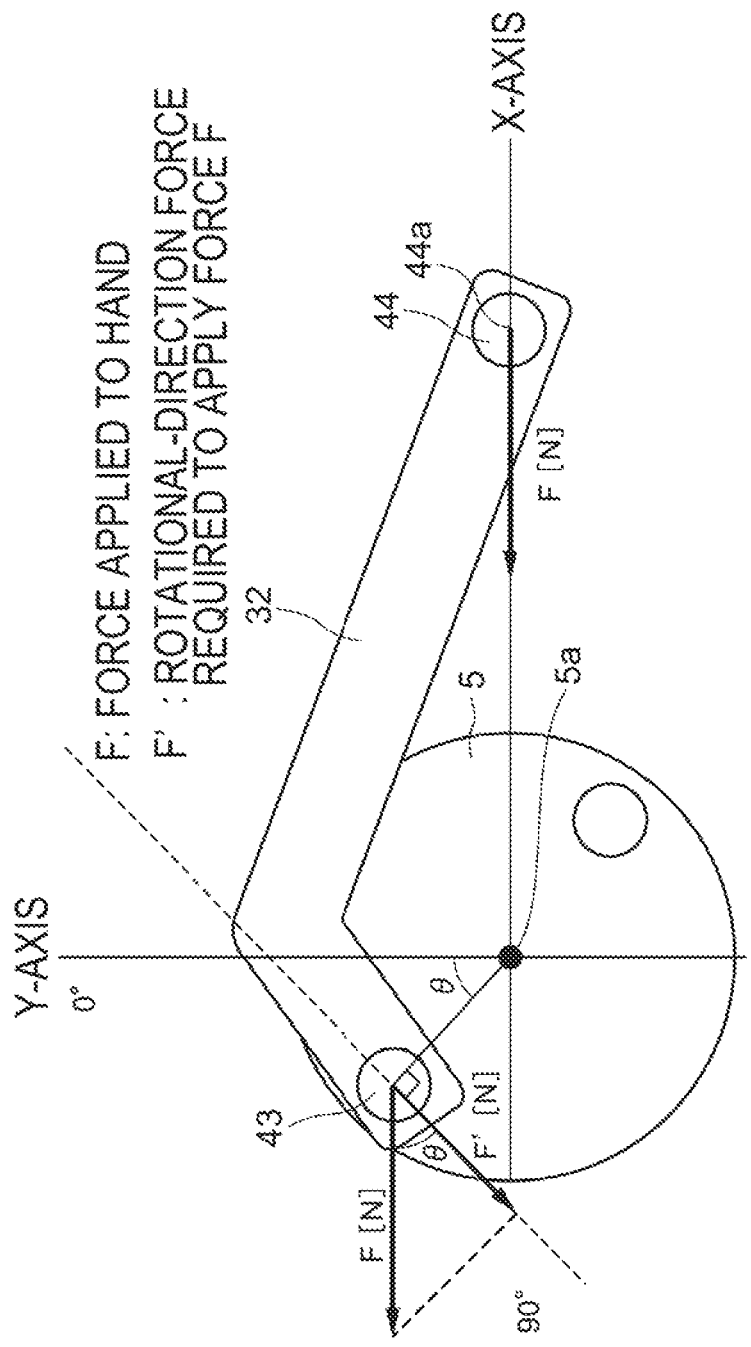
FIG. 7 is an illustration pictorially explaining the rotation angle of a rotating plate and the gripping force applied to each gripping member in the hand according to the embodiment.

FIG. 7 illustrates a relationship between the rotation angle of the rotating plate 5 and a gripping force applied to the gripping members 21 and 22. In FIG. 7, the rotating plate 5 and the second clamping link 32, which are shown in FIG. 4, are schematically illustrated. In FIG. 7, there are drawn an X-axis assigned to a line connecting the axis line 5a of the rotating plate 5 and the center 44a of the fourth shaft 44 and a Y-axis perpendicular to the X-axis. In addition, in FIG. 7, the rotation angle of the rotating plate 5 which is provided when the third shaft 43 of the second clamping link 32 is located on the Y-axis is set at 0 degrees and the rotation angles in the counterclockwise direction of the third shaft 43 is denoted as θ.

In FIG. 7, a reference F(N) shows a force applied to the fourth shaft 44 of the second clamping link 32, in which the force corresponds to a gripping force applied to the gripping member 22 (refer to FIG. 5). In addition, a reference F' in FIG. 7 is a vector indicating an output (i.e., an output of the electric motor 3) in the rotation direction, in which the output is required to apply the gripping force F to the gripping member 22.

As clearly understood from FIG. 7, the following relationship is established between F' and F:

$$F'=F \times \cos(\theta) \qquad \text{(Formula 1)}$$

In order to calculate the gripping force applied to the gripping member 22 based on the output of the electric motor 3, replacing F by F' results in the following formula:

$$F=F'/\cos(\theta) \qquad \text{(Formula 2)}$$

Figure 8:
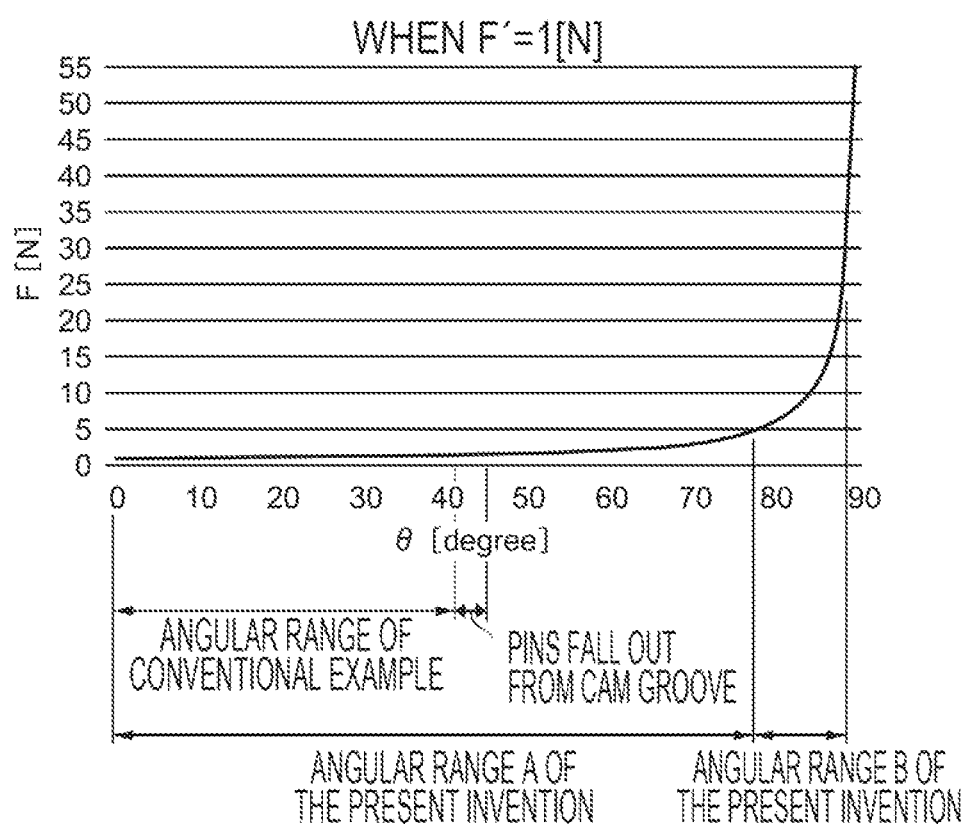
FIG. 8 is a graph showing a relationship between the rotation angle of the rotating plate and the gripping force applied to each gripping member in the hand according to the embodiment.

Provided that the output of the electric motor 3 is 1N, the formula shown by Formula 2 can be used to calculate the relationship between the rotation angle θ and the gripping force F applied to the gripping member 22, which is lead to a graph shown in FIG. 8.

As shown in FIG. 8, the graph includes a rotation angle range of 0 to 45 degrees of the rotating plate 5, in which the gripping force applied to the gripping member 22 is approximately equal to the output of the electric motor 3. As the rotation angle of the rotating plate 5 increases from 45 degrees to 80 degrees, the gripping force applied to the gripping member 22 gradually increases with a moderate gradient. When the rotation angle of the rotating plate 5 becomes larger than 80 degrees, the gripping force applied to the gripping member 22 increases sharply. Finally when the rotation angle of the rotating plate 5 reaches 90 degrees, the gripping force applied to the gripping member 22 reaches an infinite value from a theoretical viewpoint. Though FIGS. 7 and 8 explain only the second clamping link 32, the same is true of the first clamping link 31.

As described, in the present embodiment, when the gripping members 21 and 22 grip the object W, the first to fourth shafts 41 to 44 are lined up on the straight line and the rotating plate 5 provides a rotation angle of 90 degrees. Accordingly, as shown in FIG. 8, the gripping members 21 and 22 are able to grip the object W at a larger gripping force. Further, the pair of gripping members 21 and 22 is able to lock the object W. Still further, if the drive power to the electric motor 3 is lost during its operation, it possible that the gripping members 21 and 22 continue gripping the object W only by the biasing force of the coil spring 4, thus avoiding the object W from dropping.

The reason for making the rotating plate 5 rotate, as shown in FIG. 6, until a state where the center 43a of the third shaft 43 moves over the line L1 and the center 41a of the first shaft 41 moves over the line L2 is as follows. When the first to fourth shafts 41 to 44 are lined up on the straight line, the first and second gripping members 21 and 22 are mostly close to each other. A further slight rotation of the rotating plate 5 from the mostly-close state allows the first and second gripping members 21 and 22 to open slightly. The first and second gripping members 21 and 22 can securely grip the object W, by making the first and second gripping members 21 and 22 grip an object W in the state where the first and second gripping members 21 and 22 are open slightly, as if, they climb over the cam mountains for being locked. Incidentally when the center 43a of the third shaft 43 moves over the line L1, the movement amount of the center 43a from the line L1 is slight, and when the center 41a of the first shaft 41 moves over the line L2, the movement amount of the center 41a is also slight. If these movement amounts are set to be larger, the first and second gripping members 21 and 22 which grip an object W move with larger movement amounts so that the gripping members 21 and 22 come closer to each other. In this case, the electric motor 3 cannot be rotated.

Figure 9:
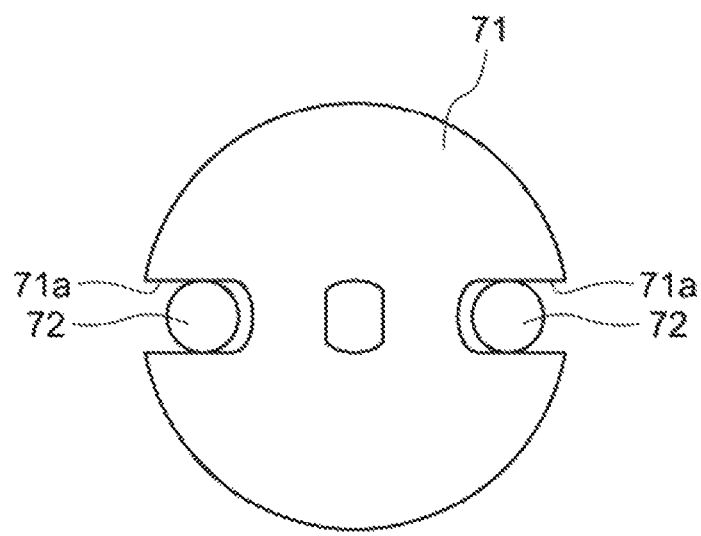
FIG. 9 is a planar view showing a disk cam installed in a conventional hand.

The hand according to the present embodiment will not be limited to the structure in which the rotating plate 5 provides a rotation angle of 90 degrees at which the object W is gripped. Alternatively, as shown in FIG. 8, another design can be made such that an object W is gripped at a given angle in an angular range A of 0 to 80 degrees provided by the rotating plate 5. In this range A, the gripping members 21 and 22 have a smaller gripping force but have a larger stroke, so that the gripping members 21 and 22 are able to grip objects W whose sizes are diverse, including smaller-size objects W and larger-size objects W. It is also possible that the gripping members 21 and 22 grip objects W in a range B in which the rotation angle of the rotating plate 5 is 80 or more degrees, but less than 90 degrees. When the rotation angle of the rotating plate 5 is 80 or more degrees, the gripping force thereof increases sharply, whereby the gripping members 21 and 22 are able to grip heavier objects W. FIG. 8 also shows an angular range of the disk cam 71 of the conventional hand shown in FIG. 9, which is a conventional example. In the conventional hand, when the rotation angle of the disk cam 71 becomes larger than 45 degrees, the pin 72 falls out of the cam groove 71a. Hence, in this conventional example, the rotation angle of the disk cam 71 should be under 45 degrees, resulting in that the disk cam 71 has a limited rotation angle of less than 45 degrees. Hence, if such a conventional structure is adopted in the present embodiment, the gripping members 21 and 22 are obliged to have a smaller stroke.

Since the first and second clamping links 31 and 32 are U-shaped, it is possible to line up the first to fourth shafts 41 to 44 on the straight line. Additionally, the U-shaped first and second clamping links 31 and 32 are easier to deform elastically. This elastic deformation provides the first and second clamping links 31 and 32 with a capability of absorbing dimension errors of objects W being gripped.

Arranging the coil spring 4 which forces the first and second gripping members 21 and 22 in the closing direction thereof makes it possible that the gripping members 21 and 22 still continue to grip an object W even if there is loss of the power to the electric motor 3 during its operation.

In addition, the first and second sliders 11 and 12 are configured to have the blocks 11a and 12a guided by the rail 2 and the link shafts 11b and 12b respectively fixed to the blocks 11a and 12a. This configuration makes it easier that the first and second clamping links 31 and 32 connected to the first and second sliders 11 and 12 and the coil spring 4 is bridged between the first and second sliders 11 and 12.

The operation member 6 for manually rotating the rotating plate 5 is arranged on the output shaft 3b of the electric motor 3. Hence, even when the first and second gripping members 21 and 22 which are gripping an object W under drive of the electric motor 3 cannot be opened, it is possible to manually open the first and second gripping members 21 and 22.

Incidentally, the present invention will not be limited to the embodied structure in the foregoing embodiment, but can be changed into other various embodiments without departing from the gist of the present invention. For example, the drive source is not limited to the electric motor, but an air cylinder, a hydraulic cylinder, and other drive devices can be used as the drive source. In the foregoing embodiment, the coil spring is bridged between the first and second sliders such that the spring force of the coil spring can be utilized to grip an object, but this is just an example. Without using such a coil spring between the first and second sliders, the electric motor can be used alone to generate torque to grip objects.

REFERENCE SIGN LIST

1 . . . hand body, 2 . . . rail, 3 . . . electric motor (drive source), 5 . . . rotating plate, 5a . . . axis line of rotating plate, 6 . . . operation member, 11 . . . first slider, 11a . . . block of first slider, 11b . . . link shaft (link member) of fist slider, 12 . . . second slider, 12a . . . block of second slider, 12b . . . link shaft (link member) of second slider, 21 . . . first gripping member, 22 . . . second gripping member, 31 . . . first clamping link, 32 . . . second clamping link, 41 . . . first shaft, 42 . . . second shaft, 43 . . . third shaft, 44 . . . fourth shaft, 41a . . . center of first shaft, 42a . . . center of second shaft, 43a . . . center of third shaft, 44a . . . center of fourth shaft

The invention claimed is:

1. A hand comprising:
   a hand body;
   a first slider and a second slider which are guided by a rail of the hand body via rolling members such that the first and second sliders are linearly movable in opening and closing directions;
   a first gripping member and a second gripping member which are fixed on the first and second sliders respectively and which are capable of gripping an object;
   a drive source arranged in the hand body;
   a rotating plate driven to rotate by the drive source;
   a first clamping link directly connected to the rotating plate so as to enable only rotation on a first shaft and directly connected to the first slider without a spring interposed therebetween so as to enable only rotation on a second shaft and so as not to be slidable; and
   a second clamping link directly connected to the rotating plate so as to enable only rotation on a third shaft and directly connected to the second slider without a spring interposed therebetween so as to enable only rotation on a fourth shaft and so as not to be slidable,
   wherein the drive source rotates the rotating plate so that the first and second gripping members linearly move in the opening and closing directions, and
   wherein, when the first and second gripping members grip an object, the first to fourth shafts line up on the straight line in an order of the second shaft, the third shaft, an axis line of the rotating plate, the first shaft, and the fourth shaft, and the first and second gripping members are at a most close position to each other, and thereafter
   the rotating plate rotates until a center of the third shaft moves beyond a line connecting the axis line of the rotating plate and a center of the second shaft and a center of the first shaft moves beyond a line connecting the axis line of the rotating plate and a center of the fourth shaft, and the first and second gripping members lock the object for gripping while being in a wider open state than the most close position to each other.

2. The hand of claim 1, characterized in that each of the first and second clamping links is formed in a U-shape so that the first and second clamping links avoid from interfering from each other.

3. The hand of claim 2, characterized in that
   the hand further comprises a forcing member forcing the first and second gripping members in the closing direction.

4. The hand of claim 3, characterized in that
   the drive source is an electric motor, and
   an output shaft of the electric motor is provided with an operation member arranged thereon so that the rotating plate can be rotated manually.

5. The hand of claim 2, characterized in that
   the drive source is an electric motor, and
   an output shaft of the electric motor is provided with an operation member arranged thereon so that the rotating plate can be rotated manually.

6. The hand of claim 1, characterized in that
   the hand further comprises a forcing member forcing the first and second gripping members in the closing direction.

7. The hand of claim 6, characterized in that
   the first slider and the second slider comprise blocks linearly movably guided by the hand body and link shafts fixed to the respective blocks,
   wherein the first and second clamping links are rotatably connected to the link shafts of the first and second sliders, respectively, and
   the forcing member is bridged between the link shafts of the first and second sliders.

8. The hand of claim 7, characterized in that each of the first and second clamping links is formed in a U-shape so that the first and second clamping links avoid from interfering from each other.

9. The hand of claim 8, characterized in that
   the drive source is an electric motor, and
   an output shaft of the electric motor is provided with an operation member arranged thereon so that the rotating plate can be rotated manually.

10. The hand of claim 7, characterized in that
    the drive source is an electric motor, and
    an output shaft of the electric motor is provided with an operation member arranged thereon so that the rotating plate can be rotated manually.

11. The hand of claim 6, characterized in that
    the drive source is an electric motor, and
    an output shaft of the electric motor is provided with an operation member arranged thereon so that the rotating plate can be rotated manually.

12. The hand of claim 1, characterized in that
    the drive source is an electric motor, and
    an output shaft of the electric motor is provided with an operation member arranged thereon so that the rotating plate can be rotated manually.

* * * * *